H. W. FAUST.
CONCENTRATING TABLE.
APPLICATION FILED SEPT. 2, 1914.

1,210,778.

Patented Jan. 2, 1917.
2 SHEETS—SHEET 1.

Witnesses

Henry W. Faust, Inventor

By

Attorneys

H. W. FAUST.
CONCENTRATING TABLE.
APPLICATION FILED SEPT. 2, 1914.

1,210,778.

Patented Jan. 2, 1917.
2 SHEETS—SHEET 2.

Witnesses
Marris B Davis
A. S. Dennison

Henry W. Faust, Inventor

By Jas W Witten
Attorneys

UNITED STATES PATENT OFFICE.

HENRY W. FAUST, OF GRANTS PASS, OREGON.

CONCENTRATING-TABLE.

1,210,778. Specification of Letters Patent. Patented Jan. 2, 1917.

Application filed September 2, 1914. Serial No. 859,810.

*To all whom it may concern:*

Be it known that I, HENRY W. FAUST, a citizen of the United States, residing at Grants Pass, in the county of Josephine, State of Oregon, have invented certain new and useful Improvements in Concentrating-Tables, of which the following is a specification.

My invention relates to a concentrating table and has as its principal object the provision of an apparatus of maximum simplicity which shall possess high efficiency in separating the value from the gangues in crushed ore and gravel.

A second object of my invention is to provide a concentrating table in which the ores may be delivered at different points as desired.

The third object of my invention is to provide an operating mechanism for concentrating tables which shall move the table very rapidly in one direction as compared with its movement in the opposite direction, but which shall avoid jars in operation.

A final object of my invention resides in the particular arrangement and combination of parts hereinafter described.

Figure 1:
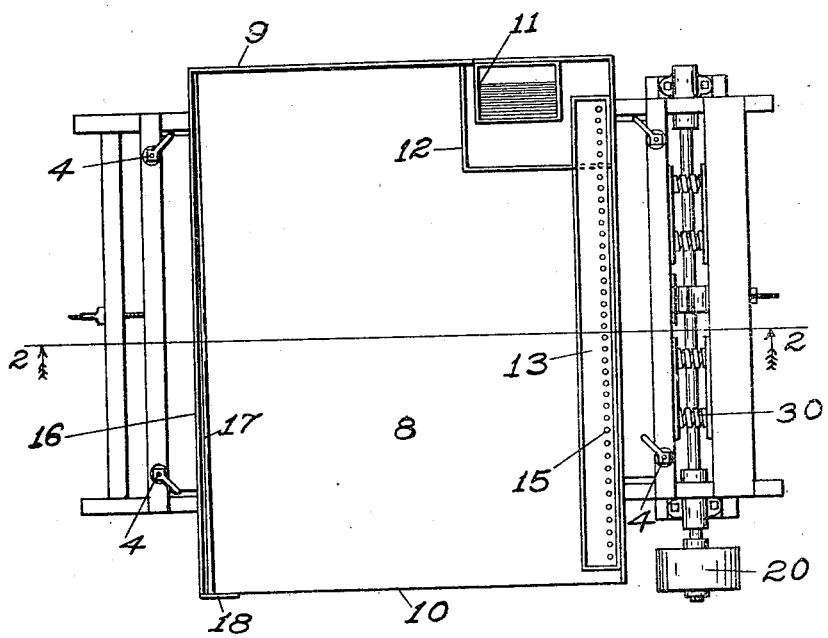
Figure 2:
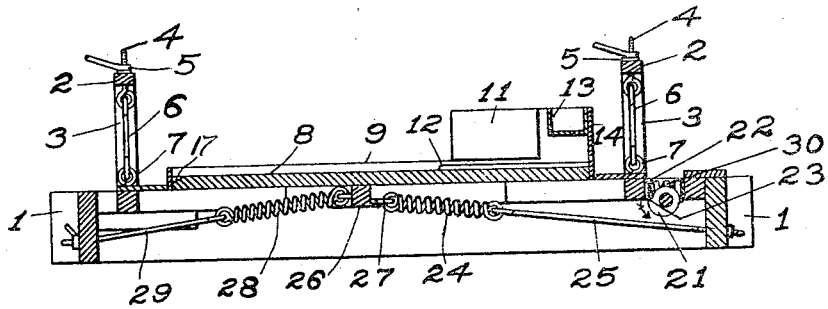
Figure 3:
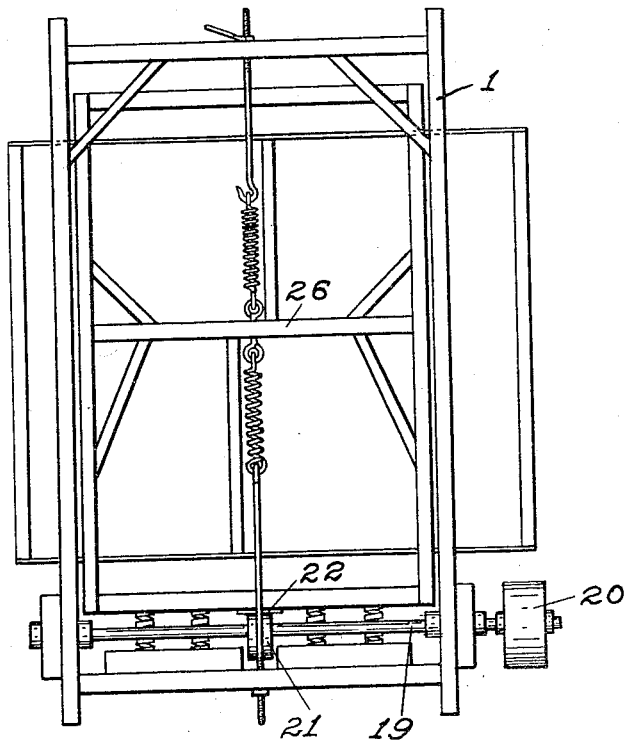
Figure 4:
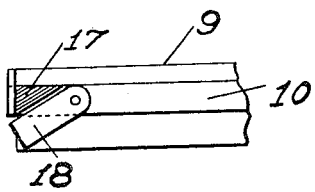

In the accompanying drawing: Figure 1 is a top plan view of a concentrating table made according to my invention. Fig. 2 is a longitudinal sectional view of the table shown in Fig. 1 taken on the line 2—2. Fig. 3 is an inverted plan view of the table shown in Figs. 1 and 2. Fig. 4 is a detail view of parts shown in Fig. 1.

In separate views the same part is designated by the same reference character.

Referring more particularly to the drawing, 1 is a frame work on which is mounted the moving parts of the device. At each end of the frame 1 is an elevated cross beam 2 supported by standards such as 3. Projecting upwardly through each of the cross beams 2 are two eye bolts 4 which are threaded at their upper ends to receive nuts such as 5 by which their height may be adjusted. Suspended by the eye bolts 4 are links 6 which, at their lower ends, hook into eye bolts 7 which are fastened in turn to the shaking table 8. It will be obvious that the pitch of the table can be regulated by the nuts 5.

The table 8 presents a substantially plane surface on top, except as hereinafter noted. I provide a rim 9 which projects somewhat above the plane of the table on three sides thereof, the fourth side 10 being left free for the discharge of the material. At one corner of the table opposite the side 10 is a feed box 11 through which material is fed onto the table. Immediately below the feed box 11 I provide an amalgamating plate or mercury container, a mercury container 12 being shown in the drawings. The plate or container may be used whenever the material contains free gold. Along one edge of the table at right angles to the edge 10 I place a water launder 13 which is supported at some distance above the table by means of a portion 14 of the rim 9 which extends to a greater height than the remainder of the rim. The water launder takes the form of a trough having apertures 15 in its bottom, said apertures extending from near the edge 10 to the mercury container 12.

Along the edge 16 of the table 8 is a groove 17 which runs at right angles to the edge 10 and parallel to the water launder 13. The groove 17 is relatively deep and wide at the edge 10 and tapers toward its other end, so that at its smaller end it is only about 1/64 of an inch deep and 1/2 inch in width while at the edge 10 it is at least 1 inch deep and from two to four inches wide. Pivoted on the edge 10 is a button 18 which is preferably made of galvanized or plate iron. The button 18 is so placed that by turning it on its pivot the groove can be opened in whole or in part or wholly closed. By adjusting the button 18 to open the groove, the coarser gangues may be taken off more rapidly, while by altering the position of the button to close the groove more or less, the point at which the gangues are delivered may be changed as desired within certain limits. Of course, if the groove is wholly closed the effect is the same as if the table were perfectly flat.

For operating the table 8 I provide a shaft 19 on which is fixed a driving pulley 20. Near the center of the shaft is a cam 21 for shaking the table, the effective surface of said cam being shown in outline in Fig. 2. It will be seen that the cam is so shaped as to throw the table toward the left as seen in Fig. 2 with a comparatively slow movement. As the cam turns in the direction of the arrow, the cam bears against the plate 22 which is fastened to the table 8. However, when the point of contact between the cam and the plate 22 reaches the cut-away portion 23 on the cam, the table may move toward the right as shown in Fig. 2 with great suddenness. The movement of the table toward the right is caused by spring 24 which is connected at one end to frame 1 by means of an adjustable rod 25, the other end of the spring being secured to a cross bar 26 carried by the table 8 by means of an eye bolt 27. The cross bar 26 is connected to the opposite end of the frame 1 by means of a spring 28 and an adjustable rod 29, the strength of spring 24 being considerably greater than that of the spring 28. At the same end of the frame as the cam, 21, I provide a number of springs 30 which are mounted between the cam and the table so as to arrest and reverse the movement of the table when it is moving from left to right under influence of spring 24.

In the operation of my device the table swings within the frame 1 as previously described and when the table slips from contact with the cam at the point 23 the spring 24 literally jerks the table toward the cam. Now as the table moves toward the cam the tension in the spring 24 begins to decrease while the spring 28 begins to pull on the table in the opposite direction, the rods 25 and 29 being adjusted so as to produce this action.

While the spring 28 reduces the speed of the table to some extent it is desirable to avoid jars and especially any shock which would move the material on the table in a different direction from that given it by the action of the spring 24. Consequently these springs 30 are so arranged as to catch the table and reverse the movement thereof before it strikes the cam. I have found by watching my table closely when in operation that in striking against the springs 30 the table is given a shaking, or tremulous or vibratory motion, which has the effect of settling the fine particles to the surface of the table, and then the reverse movement is started by spring 28. I attribute this tremulous or vibratory motion to the fact that as the table is jerked by spring 24 toward the head of the table, spring 28 comes into play and has to some extent reduced the motion of the table caused by spring 24 by the time it reaches and strikes springs 30, and that at this point the effect of all the springs is momentarily in equilibrium so that the springs hold the table in a rigid manner and cause a tremulous motion to take place, spring 24 having the tendency to hold the table against the springs 30 and this tendency is accentuated by the weight of the table coming against springs 30 with considerable velocity, causing the springs 30 to vibrate before spring 28 comes into full play to reverse the movement of the table. This action is so rapid that it is only perceptible when closely watched, but it is of the utmost importance, for, I find that the ores after being dislodged by the movement caused by spring 24 and thrown up on to table are settled to the surface thereof by the vibrating movement. The strength of the different springs is so well calculated that the cam actually catches the table while the table is moving away from the cam, thus causing no jar whatever to the table and preventing the water on the top surface of the table from rippling. It should be understood that the initial speed of the table from left to right under the influence of the spring 24 is in the neighborhood of one thousand times its speed of movement from right to left under the influence of the cam 21.

As the table is reciprocated in the manner just described, the ore is fed through the box 11, so that the free gold is retained by the mercury container or amalgamating plate and at the same time the water is fed through the launder 13, the motion of the table being such as to throw the ore toward the side having the launder 13, the gangues going off the table in the groove 17 and over the edge 10, owing to the inclination of the table toward the side 16, as well as the side 10. This inclination is adjusted by the nuts 5. The lighter materials move toward the edge 10, near the groove 17, the heavier materials being thrown upward on the table toward side 14 and launder 13, owing to the peculiar movement imparted to the table by the operating apparatus previously described. The point of delivery is determined within limits by the adjustment of the bolts and nuts 5 and also by the button 18. I find that the groove keeps the ore on the surface of the table at absolutely the same depth over the surface, except, probably, at the highest point thereof, where the values come off the table. The button or gate 18 is needed to control the position of the concentrates on the table, for when the table is receiving but a little feed, the concentrates would have a tendency to wash downward on the table unless the gangues were held back so that they would bank up somewhat on the table forming a cushion for holding the ores. If the gate were wide open when using a light feed, as is necessary with certain materials, the concentrates washing down on the table as above mentioned, would spread out over a greater surface and mix to a great extent with the gangues. Therefore by closing the gate, the concentrates are forced to a higher point of delivery on the table, getting them nearer to the action of the wash water coming from the launder, thereby securing a cleaner product. Also, when the gate is closed, it has a tendency to bank up the water at the discharge or groove end of the table, causing the water to act as a cushion and holding the gangue and also the concentrates to a straighter line.

It will be understood that while I have shown and described the preferred form of my invention that I contemplate all such modifications as are mechanically equivalent to the form shown and described herein. In particular it should be understood that the size, proportion and arrangement of parts may be varied without departing from my invention.

Having thus described my invention, I claim:

1. A concentrating device comprising a substantially flat inclined shaking table having a groove running substantially perpendicular to the discharge edge of the table for carrying off the gangues, means whereby said groove may be opened or closed as desired, means for supplying water along the edge of the table which is parallel and opposite to said groove, and means for shaking said table in such a manner that the waste material will move toward said groove under the influence of the water and the values will move in substantially the opposite direction.

2. A concentrating device comprising in combination, a cam for moving said table in one direction only and arranged to have a direct contact with said table, a spring independent of said cam for jerking said table in the opposite direction, and a second spring arranged to change the motion of the table after it has been jerked by the first mentioned spring, said springs acting to prevent the table from contacting with any fixed member.

3. A concentrating device comprising in combination, a table, a cam for moving said table in one direction only and arranged to act directly on the table, a spring independent of said cam for starting said table in the opposite direction, and resilient means, also independent of said cam, for reversing the movement of said table after it has been started by said spring, said cam being so arranged as to overtake said table and accelerate movement of the table after it has been reversed, said springs being adapted to prevent the table from contacting with any fixed member.

4. A concentrating device comprising in combination a flat inclined table, and means for reciprocating said table, said means comprising a cam for moving the table in one direction, a tension spring adapted to jerk the table in the opposite direction when released by the cam, a second tension spring for reducing the speed of the table at the end of the movement produced by said first mentioned tension spring, and buffer springs adapted to reverse the movement of the table independently of said cam, said springs being adapted to give the table a momentary tremulous or vibratory action at the turn of the second mentioned reversal.

5. A concentrating device comprising in combination a flat inclined shaking table having a rim around three sides thereof, the fourth side being the delivery edge, a water launder arranged at one end of the table perpendicular to said delivery edge, means for delivering pulp to the table at the inner end of the launder, means for shaking the table in a direction perpendicular to the launder, the table having a groove along the side opposite the launder for facilitating the delivery of gangues and water, and a gate for regulating the discharge from said groove, whereby the level of the gangues and water may be maintained on the table as desired.

In testimony whereof I affix my signature in presence of two witnesses.

HENRY W. FAUST.

Witnesses:
M. CLEVELAND,
A. B. CORNELL.

Copies of this patent may be obtained for five cents each, by addressing the "Commissioner of Patents, Washington, D. C."